United States Patent
Bryg et al.

(10) Patent No.: US 6,393,544 B1
(45) Date of Patent: May 21, 2002

(54) METHOD AND APPARATUS FOR CALCULATING A PAGE TABLE INDEX FROM A VIRTUAL ADDRESS

(75) Inventors: William R. Bryg, Saratoga; Stephen G. Burger, Santa Clara, both of CA (US); Gary N. Hammond, Fort Collins, CO (US); James O. Hays, San Jose; Jerome C. Huck, Palo Alto, both of CA (US); Jonathan K. Ross, Woodinville, WA (US); Sunil Saxena, Sunnyvale; Koichi Yamada, San Jose, both of CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/430,793

(22) Filed: Oct. 31, 1999

(51) Int. Cl.$^7$ ............................................... G06F 12/00
(52) U.S. Cl. ................. 711/220; 711/203; 711/216; 711/206; 711/221; 711/202
(58) Field of Search ................................. 711/202, 203, 711/205, 206, 207, 209, 216, 220, 212, 221

(56) References Cited

U.S. PATENT DOCUMENTS

| | | | | |
|---|---|---|---|---|
| 5,630,087 A | * | 5/1997 | Talluri et al. ................ | 711/202 |
| 5,649,142 A | * | 7/1997 | Lavelle et al. ............... | 711/209 |
| 5,706,461 A | * | 1/1998 | Branstad et al. ............. | 711/203 |
| 5,724,538 A | | 3/1998 | Morris et al. ................ | 711/206 |
| 5,809,563 A | * | 9/1998 | Yamada et al. .............. | 711/207 |
| 5,826,057 A | * | 10/1998 | Okamoto et al. ............. | 703/24 |
| 5,918,251 A | * | 6/1999 | Yamada et al. .............. | 711/207 |
| 5,946,716 A | * | 8/1999 | Karp et al. .................. | 711/207 |
| 6,079,004 A | * | 6/2000 | Liedtke ....................... | 711/207 |
| 6,088,780 A | * | 7/2000 | Yamada et al. .............. | 711/206 |
| 6,145,064 A | * | 11/2000 | Long et al. .................. | 711/158 |

FOREIGN PATENT DOCUMENTS

WO    WO98 44417    10/1998

* cited by examiner

Primary Examiner—Hiep T. Nguyen
Assistant Examiner—Hong Kim
(74) Attorney, Agent, or Firm—David A. Plettue

(57) ABSTRACT

A method and apparatus calculate a page table index from a virtual address. Employs a combined hash algorithm that supports two different hash page table configurations. A "short format" page table is provided for each virtual region, is linear, has a linear entry for each translation in the region, and does not store tags or chain links. A single "long format" page table is provided for the entire system, supports chained segments, and includes hash tag fields. The method of the present invention forms an entry address from a virtual address, with the entry address referencing an entry of the page table. To form the entry address, first a hash page number is formed from the virtual address by shifting the virtual address right based on the page size of the region of the virtual address. If the computer system is operating with long format page tables, the next step is to form a hash index by combining the hash page number and the region identifier referenced by the region portion of the virtual address, and to form a table offset by shifting the hash index left by K bits, wherein each long format page table entry is $2^K$ bytes long. However, if the computer system is operating with short format page tables, the next step is to form a hash index by setting the hash index equal to the hash page number, and to form a table offset by shifting the hash index left by L bits, wherein each short format page table entry is $2^L$ bytes long. Next, a mask is formed based on the size of the page table. A first address portion is then formed using the base address of the page table and the mask, and a second address portion is formed using the table offset and the mask. Finally, the entry address is formed by combining the first and second address portions. By providing a single algorithm capable of generating a page table entry for both long and short format page tables, the present invention reduces the amount of logic required to access both page table formats, without significantly affecting execution speed.

20 Claims, 6 Drawing Sheets

METHOD AND APPARATUS FOR CALCULATING A PAGE TABLE INDEX FROM A VIRTUAL ADDRESS

FIELD OF THE INVENTION

The present invention relates to memory organization in computer systems. More specifically, the present invention relates to virtual memory systems having page tables that are accessed via a hash function.

DESCRIPTION OF THE RELATED ART

Conventional computer systems use a technique called virtual memory that simulates more logical memory than actually exists and allows the computer to run several programs concurrently regardless of their size. Concurrent user programs access main memory addresses via virtual addresses assigned by the operating system. The mapping of the virtual addresses to the physical addresses of the main memory is a process known as virtual address translation. Virtual address translation can be accomplished by any number of techniques, thereby allowing the processor to access the desired information in main memory.

The virtual address and physical address spaces are typically divided into equal size blocks of memory called pages, and a page table provides the translation between virtual addresses and physical addresses. Each page table entry typically contains the virtual address and/or the physical address, and protection and status information concerning the page. Status typically includes information about the type of accesses the page has undergone. For example, a dirty bit indicates there has been a modification to data in the page. Because the page tables are usually large, they are stored in memory. Therefore each regular memory access can actually require at least two accesses, one to obtain the translation and a second to access the physical memory location.

Many computer systems that support virtual address translation use a translation lookaside buffer (TLB). The TLB is typically a small, fast, associative memory which is usually situated on or in close proximity to the processor unit and stores recently used pairs of virtual and physical addresses. The TLB contains a subset of the translations in the page table and can be accessed much more quickly. When the processing unit needs information from main memory, it sends the virtual address to the TLB. The TLB accepts the virtual address page number and returns a physical page number. The physical page number is combined with low order address information to access the desired byte or word in main memory.

In most cases, the TLB cannot contain the entire page table, so procedures need to be implemented to update the TLB. When a virtual page is accessed, the translation for which is not in the TLB, the page table is accessed to determine the translation of this virtual page number to a physical page number, and this information is entered in the TLB. Access to the page table can take twenty times longer than access to the TLB, and therefore program execution speed is optimized by keeping the translations being utilized in the TLB.

Most computer systems today use some sort of mass storage, typically a disk, to augment the physical random access (RAM) memory in the computer. This augmentation of main memory enables larger programs to be implemented than if only main memory were available. In addition, disk memory is considerably less expensive than RAM, but is also orders of magnitude slower. Depending on the length of a program and the competition with other programs for main memory, part of a program may reside in main memory and part may reside on disk at any particular point in time. The parts of a program that need to be accessed immediately are brought into main memory while the parts not currently used are left on the disk.

For example, consider a single program that is two megabytes long and is executed on a computer having one megabyte of main memory. The program will require two megabytes of virtual address space. Since the main memory can only hold one megabyte, at most half of the program can reside in main memory at any given time and the remainder of the virtual address space is stored on the disk. Access to the information in main memory occurs normally. That is, the TLB is looked to first to see if it has the translation, and if not in the TLB, the TLB is updated using information from the page table and then the TLB is again referenced to get the desired translation information.

If access to the information that is not in the main memory occurs, then the TLB is accessed first for the translation, which will not be there. Then the page table is referenced to get the translation information to update the TLB. However the page table only has the translations for information in main memory, and therefore will not have the required translation information. This condition is called a page fault. In response to a page fault, a page fault handler finds a free physical page, loads the physical page with the required virtual page stored on the disk, and inserts the translation into a page table. If all physical pages have already been associated with other virtual pages, then the page fault handler needs to select which virtual pages currently stored in physical memory to swap out to the disk. There are many algorithms for performing this task, such as the first-in-first-out and least-recently-used algorithms. The page fault handler is typically implemented in software, while the TLB update process can be handled either by hardware or software, as is well known in the art.

FIG. 1 illustrates the process described above. In step 112 a virtual address is 1 presented to the TLB. If the translation for that virtual address is in the TLB (a TLB hit), then the associated physical address is derived from the TLB and is utilized to access physical memory (step 114). If the translation for that virtual address is not in the TLB (a TLB miss), then the page table is accessed for the translation (step 116). If the translation is in the page table, then this information is inserted in the TLB (step 118) and the virtual address is again presented (step 112). This time there will be a TLB hit so that the resulting physical address is used to access physical memory.

If the virtual address is in a page of virtual addresses for which no page of physical addresses is associated, then there will be no entry for this page in the page table and a page fault will occur. In this situation, a software page fault handler (step 120) will assign a physical page to the virtual page, copy the page from disk to the physical page, and update the page table. Then the virtual address is again presented to the TLB. Since the TLB does not yet have the translation, there will be another TLB miss and the TLB will be updated from the page table. Thereafter, the virtual address is again presented to the TLB, and this time a TLB hit is assured and the resulting physical address is used to access physical memory.

FIG. 2 illustrates a simplified method of accessing an entry in a translation lookaside buffer (TLB) in response to the presentation of a virtual address. To simplify the example, the illustrated TLB has only one entry, whereas a TLB would normally have many more entries. The virtual address is loaded into a register 201. This virtual address is composed of two parts a virtual page number 203 and a physical offset 205. The physical offset corresponds to the page size. For a computer system having a page size of 4 kilobytes, the physical offset 205 is the lower 12 bits (bits 11-0) of the address and specifies a particular byte within a page. The remaining bits in the register indicate the virtual page number. The term "page offset" is a term often used in the industry and is synonymous with the term "physical offset". The virtual address may include other bits that are used in uniquely specifying a translation to a physical page number, such as "address space identifier" bits or "region identifier" bits.

For the example illustrated, the virtual page number becomes the virtual tag, which supplies one input for the TLB comparator 207. A TLB 209 has two linked parts, a TLB tag 211 and an associated physical page number 213. The TLB tag 211 supplies the second input to the TLB comparator 207 and the comparator compares the TLB tag to the virtual tag. If the tags match, then the comparator indicates a TLB hit and the physical page number 213 is combined with the physical offset 205 to provide the physical (real) memory address. If the tags do not match, then there has been a TLB miss and the TLB miss process described in association with FIG. 1 is employed to update the TLB.

FIG. 3 illustrates the process of retrieving the physical page information given the virtual page number as would be required to update the TLB after a TLB miss. As described above, the virtual-to-physical mappings are maintained in a page table. For translating a given virtual address to a physical address, one approach is to perform a many-to-one (hash) function on the virtual address to form an index into the page table. This gives a pointer to a linked list of entries. These entries are then searched for a match. To determine a match, the virtual page number is compared to an entry in the page table (virtual tag). If the two are equal, that page table entry provides the physical address translation.

In the example illustrated, a hash function 301 is performed on the virtual page number 203 to form an index. This index is an offset into the page table 303. As shown, the index is 0, that is, the index points to the first entry 305 in the page table. Each entry in the page table consists of multiple parts, but typically includes at least a virtual tag 307, a physical page 309 and a pointer 311. If the virtual page number 203 equals the virtual tag 307, then physical page 309 gives the physical (real) memory page address desired. If the virtual tag does not match, then the pointer 311 points to a chain of entries in memory which contain virtual to physical translation information. The additional information contained in the chain is needed as more than one virtual page number can hash to the same page table entry.

As shown, pointer 311 points to a chain segment 313. This chain segment contains the same type of information as the initial page table entries. As before, the virtual page number 203 is compared to the next virtual tag 315 to see if there is a match. If a match occurs, then the associated physical page 317 gives the address ofthe physical memory page desired. If a match does not occur, then the pointer 319 is examined to locate the next chain segment, if any. If the pointer 319 does not point to another chain segment, as shown, then a page fault has occurred. A page fault software program is then used, as described in association with FIG. 1, to update the page table.

The above described method works well for systems where the virtual TAG is less than or equal to the basic data path size of the computer. However, if the virtual TAG is larger than the data path size, then two compares are required to test if the virtual TAG and the virtual page number are the same.

U.S. Pat. No. 5,724,538 to Dale Morris et al, which is entitled "Computer Memory Address Control Apparatus Utilizing Hashed Address Tags in Page Tables Which Are Compared to a Combined Address Tag and Index Which Are Longer than the Basic Data Width of the Associated Computer" and is hereby incorporated by reference, discloses a scheme for reducing the size of the virtual tag, thereby reducing the number of compares required to test if the virtual TAG and the virtual page number are the same. Basically, Morris et al recognized that part of the virtual address is already represented by the hash index, and therefore that part of the address need not be represented by the virtual tag.

FIG. 4 shows a simplified block diagram of an embodiment disclosed by Dale Morris et al. In FIG. 4, the page table 413 contains "hash tags" 421 and 423. Hash index 409 is formed by taking the virtual page number bits 401 and performing an index hash function 405 on the bits, with the result being no larger than the basic data width of the computer. Similarly, the hash tags are formed by taking the virtual page number bits 401 and performing a tag hash function 427, with the resulting hash tags being no larger than the basic data width of the computer. Note that although FIG. 4 does not show an explicit connection between tag hash function 427 and hash tags 421 and 423, the algorithm represented by tag hash function 427 is used when hash tags 421 and 423 are generated and inserted into page table 413.

Index hash function 405 and tag hash function 427 are complimentary to the extent that for any given virtual page number, the combination of the resulting hash index and the resulting hash tag are unique. Accordingly, when a virtual page is to be accessed, the virtual page number 401 is applied to index hash function 405 to generate a hash index, which points to a hash tag (such as hash tag 421 or 423) in page table 413. The hash tag provided from table 413 is routed to compare function 429. Simultaneously, virtual page number 401 is also provided to tag hash function 427 to produce hash tag 425. If hash tag 425 and the hash tag from page table 413 match, then the physical page (such as the physical pages stored at entries 317 and 417) is used to complete the memory access operation. If the tags do not match, the pointer of the page table entry (such as pointers 319 and 419) are accessed to see if a chain segment exists. If there are no chain segments, or all chain segments have been searched without finding a match, then the page fault handler of the operating system is invoked, as described above.

Note that the index hash function 405 and the tag hash function 427 are accessed by both hardware and software. Hardware must access the hash functions when translating a virtual page number to a physical page number, and software must access the hash functions when initializing the page table, and when accessing and modifying the page table, such as required when servicing a page fault. In the prior art, the hash algorithms were, in essence, provided in two forms. Computer hardware included hardware-based versions of the hash algorithms to allow virtual-to-physical translations to proceed quickly, and the operating system included software-based versions of the hash algorithms to generate virtual-to-physical translations when initializing, accessing, or modifying the page table.

Some computers expand the virtual addressing concept by supporting regions. Regions provide the capability to effectively create independent local, shared and global address spaces within the virtual address space by dividing the virtual address space into equally sized regions. Typically, only a subset of regions can be active at any time. Associated with each region is a region identifier, which uniquely tags address translations of given regions. If the region identifier for a region is assigned to a particular process, this region space becomes local to that process. If the region identifier for a region is shared among processes, this region space becomes shared. If the region identifier for a region is shared by all processes, this region becomes global. Changing the region identifiers for the local regions effectively swaps virtual addresses from the local space of one process to the local space on another process. Thus, regions virtually eliminate the need to flush the TLB when switching process, thereby improving overall system performance.

SUMMARY OF THE INVENTION

The present invention is a method and apparatus for calculating a page table index from a virtual address. The present invention is implemented by a combined hash algorithm that supports two different hash page table configurations in a single computer architecture via configuration registers and predefined constants.

The present invention can be used, for example, in conjunction with a virtual addressing scheme having a 64-bit virtual address, with the upper three bits forming a virtual region portion. Accordingly, eight regions can be specified by a virtual address at any given time. The remaining 61 bits of the virtual address are used to address memory within each region, thereby providing each region with $2^{61}$ bytes of virtual memory. Associated with each memory page is a 24-bit region identifier. Therefore, the operating system can assign up to $2^{24}$ individual virtual address spaces. Memory pages can range in size from 4 kilobytes to 256 megabytes.

The first hash page table configuration supports a region-based linear page table, and will be referred to herein as a "short format" page table. A short format page table is provided for each virtual region, is linear, and has a linear entry for each translation in the region. The short format page table does not require chain segments, and the short format page table does not include hash tag entries. The second hash page table configuration supports a single page table for the entire computer system and will be referred to herein as a "long format" page table. The long format page table supports chain segments, and long format page table entries include a hash tag field.

In one embodiment, the method of the present invention forms an entry address from a virtual address, with the entry address referencing an entry of the page table. To form the entry address, first a hash page number is formed from the virtual address by shifting the virtual address right by J bits, wherein the preferred page size of the region associated with the region portion of the virtual address is $2^J$ bytes.

If the computer system is operating with long format page tables, the next step is to form a hash index by combining the hash page number and the region identifier referenced by the region portion of the virtual address, and to form a table offset by shifting the hash index left by K bits, wherein each long format page table entry is $2^K$ bytes long.

However, if the computer system is operating with short format page tables, the next step is to form a hash index by setting the hash index equal to the hash page number, and to form a table offset by shifting the hash index left by L bits, wherein each short format page table entry is $2^L$ bytes long.

Next, a mask is formed based on the size of the page table. A first address portion is then formed using the base address of the page table and the mask, and a second address portion is formed using the table offset and the mask. Finally, the entry address is formed by combining the first and second address portions.

In another embodiment, a region portion is inserted into the entry address. If the format is set to long, the region portion is derived from the region portion of the base address of the page table. However, if the region is set to short, the region portion is derived from the region portion of the virtual address.

In yet another embodiment, the maximum size of a long format page table is increased by inserting the region portion of the virtual address into the hash page number when the format is set to long.

The present invention also includes several embodiments that reduce the amount of logic used to implement the present invention based on certain implementation dependant parameters. By providing a single algorithm capable of generating a page table entry for both long and short format page tables, the present invention reduces the amount of logic required to access both page table formats, without significantly affecting execution speed.

BRIEF DESCRIPTION OF THE DRAWINGS

FIG. 6 shows an entry of a "short format" virtual hashed page table, which may be accessed by application of the hashing function of the present invention.

FIG. 7 shows an entry of a "long format" virtual hashed page table, which may be accessed by application of the hashing function of the present invention.

DETAILED DESCRIPTION OF THE PREFERRED EMBODIMENTS

The present invention is a method and apparatus for calculating a page table index and a hash tag from a virtual address. The present invention is implemented by a combined hash algorithm that supports two different hash table configurations in a single computer architecture via configuration registers, and an algorithm that generates a hash tag from a virtual address.

Before discussing the present invention in greater detail, first consider the architectural framework in which the present invention may be implemented. A pending U.S. Pat. Application by entitled "A Method and Apparatus for Exposing a Hardware-based Virtual Memory Hash Scheme to Software" by Stephen Burger et al is hereby incorporated by reference. This application is assigned to the same assignee as the present application, was filed on Oct. 12, 1998, and has been assigned U.S. Ser. No. 09/170,143. Burger et al. disclose two instructions that expose to software the hash algorithms used by hardware to access a page table. The first instruction is Translation Hashed Entry Address (THASH) instruction and generates from a virtual address a hash index that points to an entry in the page table. The second instruction is the Translation Hashed Entry Tag (TTAG) instruction and generates from a virtual address a hash tag that is stored in the entry of the page table referenced by the hash index. By providing these two instructions, Burger et al. taught that a computer operating system (or other system software) need not be encoded with the hash algorithms used by the computer hardware. Rather, the THASH and TTAG instruction provide an interface that allows software to access the hash algorithms used by hardware. The present invention is related to the above application in that the present invention provides one possible algorithm that may be used by the THASH instruction. In addition one possible algorithm that may be used by the TTAG instruction is disclosed below.

Figure 1:
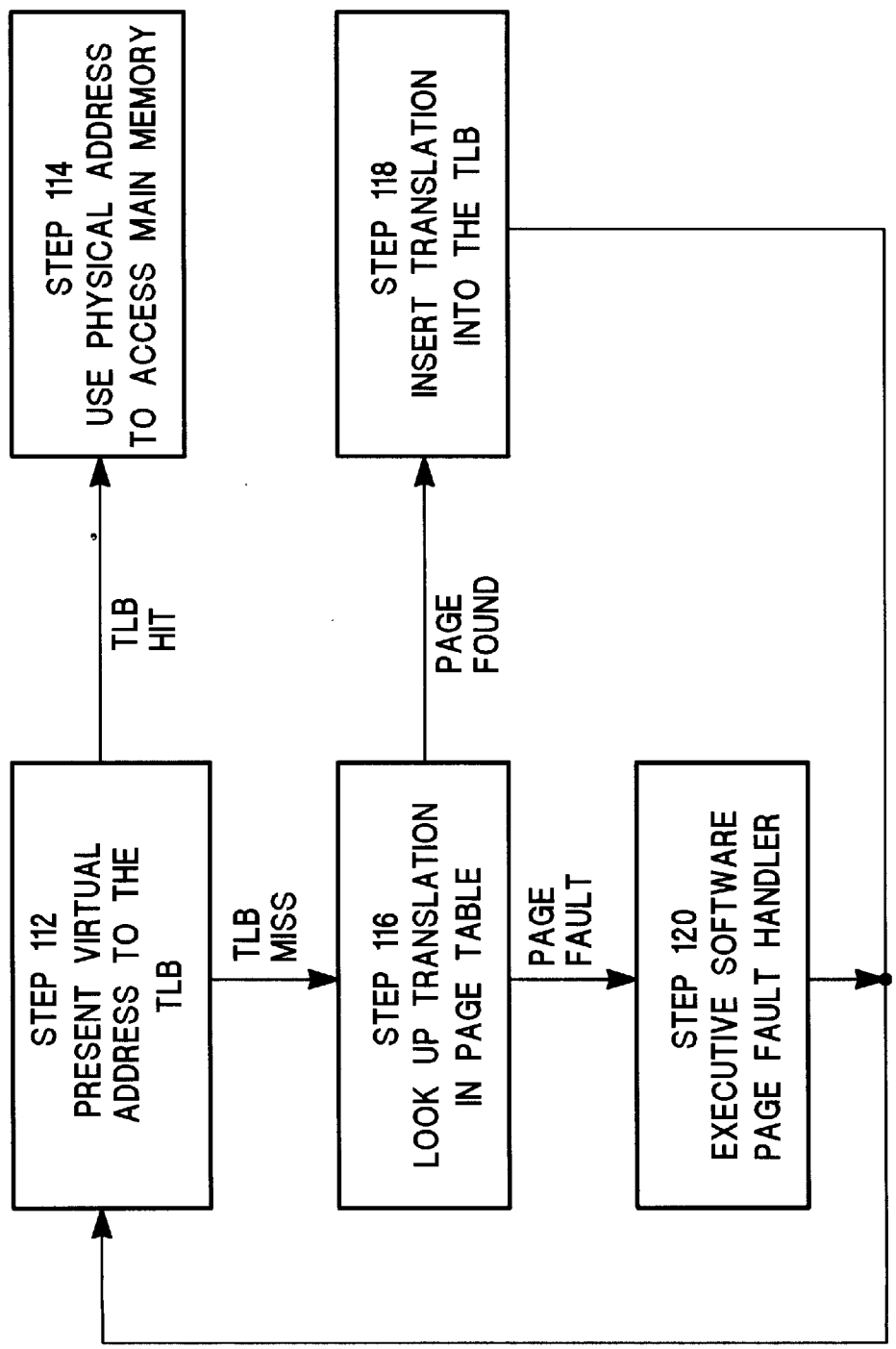
FIG. 1 illustrates a prior art procedure for responding to virtual addresses that are presented during execution of a program.
Figure 2:
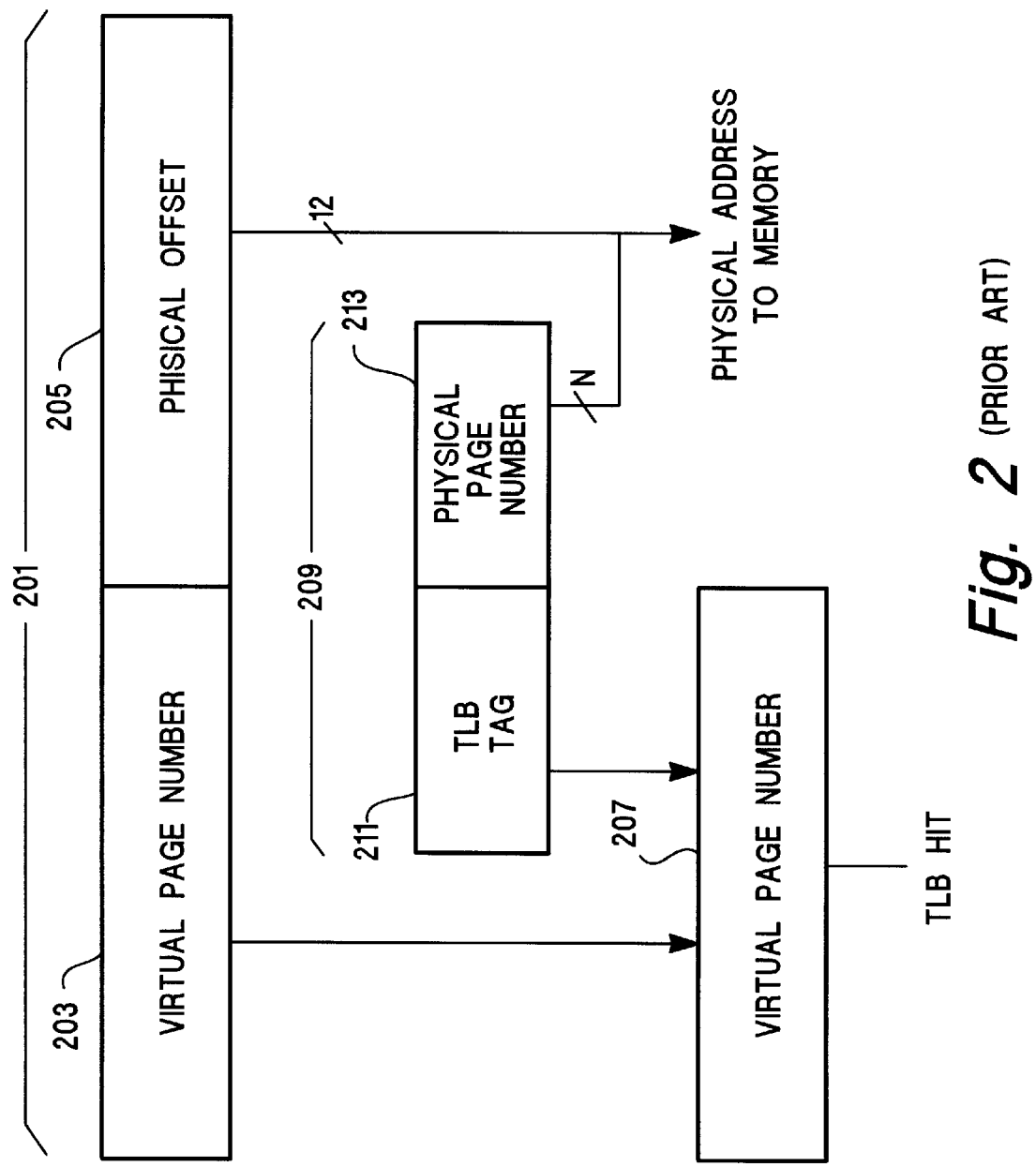
FIG. 2 illustrates a prior art method of accessing an entry in a translation lookaside buffer (TLB).
Figure 3:
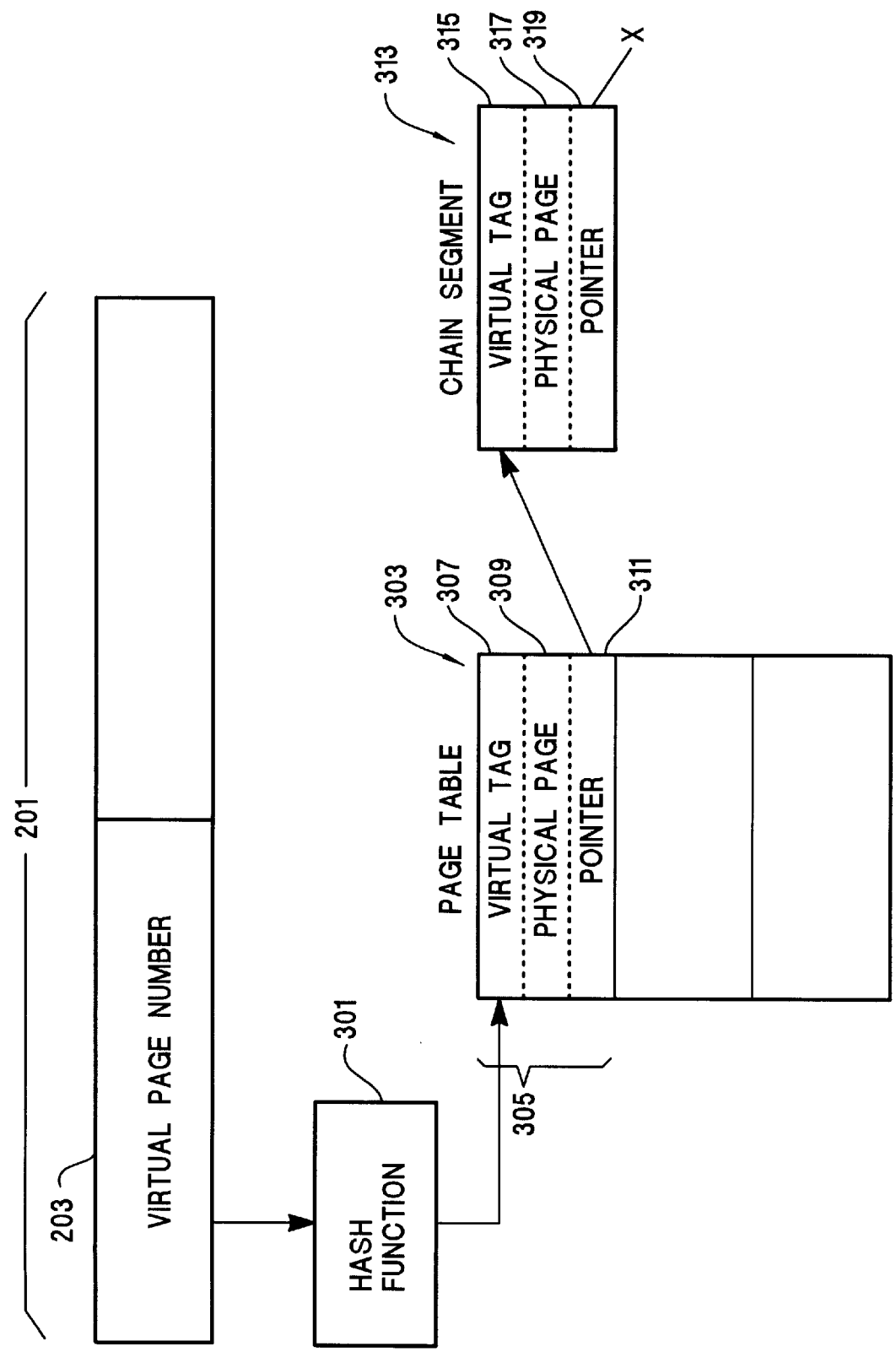
FIG. 3 illustrates a prior art method of retrieving physical page information to update a TLB after a TLB miss.
Figure 4:
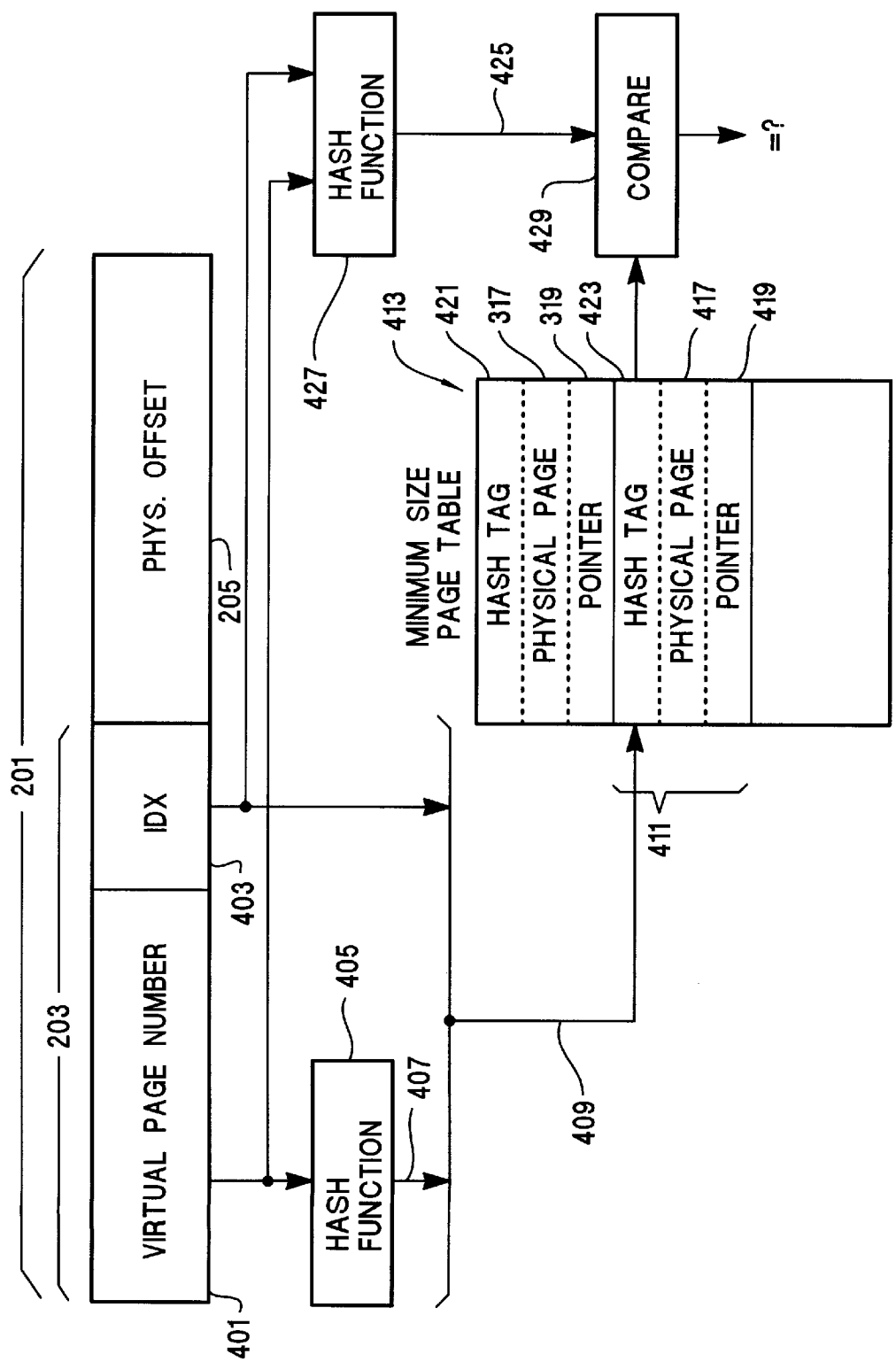
FIG. 4 illustrates a prior art page table scheme wherein hash tags are stored in a page table.
Figure 5:
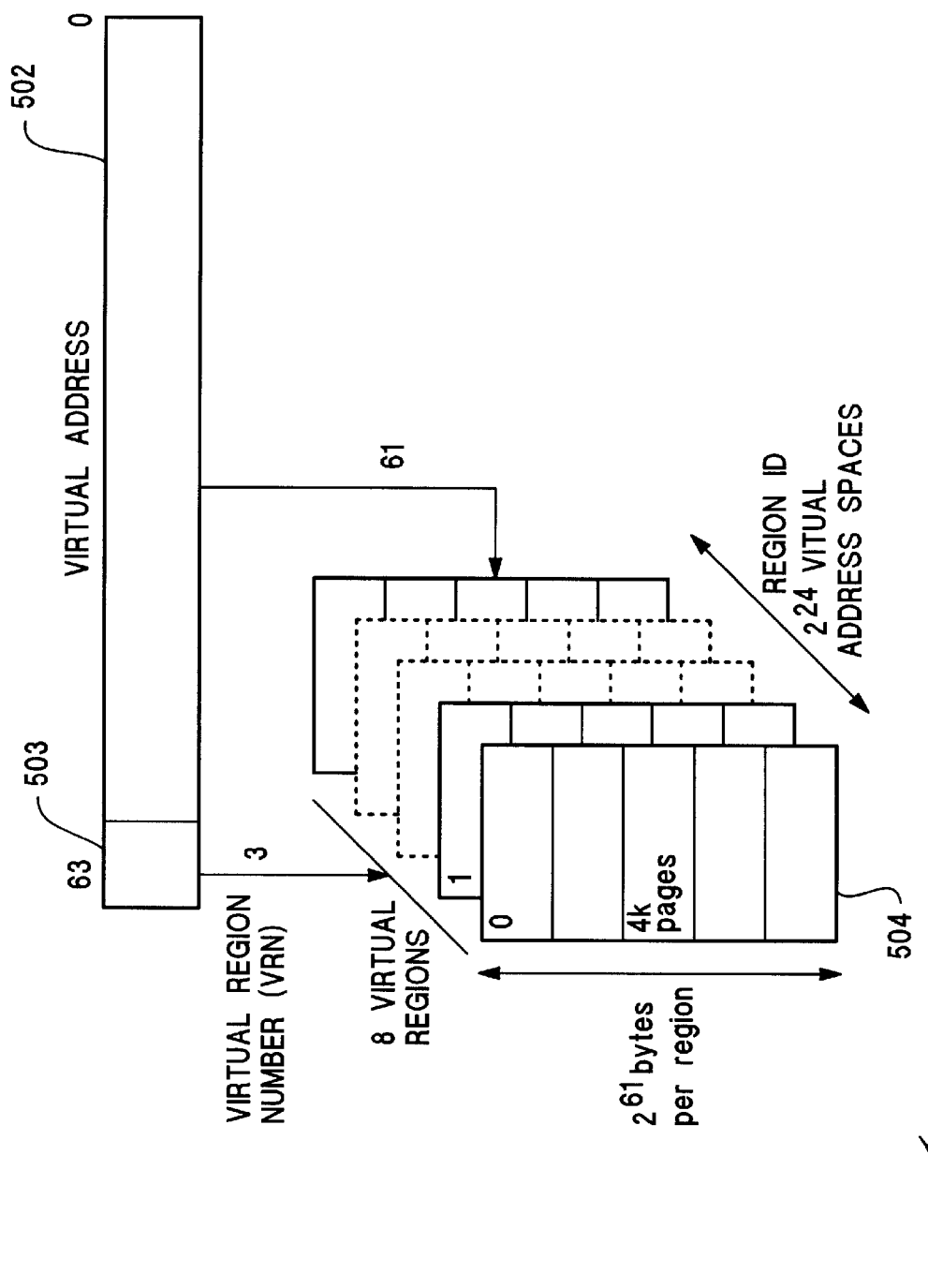
FIG. 5 illustrates a virtual addressing scheme supported by the present invention.

The present invention supports the virtual addressing scheme 501 shown in FIG. 5. Virtual address 502 is a 64-bit address. The upper three bits form a virtual region number (VRN) 503. Accordingly, eight regions can be specified by a virtual address at any given time. The remaining 61 bits of virtual address 502 are used to address memory within each region, thereby providing each region with $2^{61}$ bytes of virtual memory. Associated with each memory page (such as page 504) is a 24-bit region identifier (RID). Therefore, the operating system can assign up to $2^{24}$ individual virtual address spaces. Memory pages can range in size from 4 kilobytes to 256 megabytes, as described in greater detail below. Additional information describing virtual regions can be found in a co-pending U.S. Patent Application entitled "A Method and Apparatus for Pre-validating Regions in a Virtual Addressing Scheme" by Stephen Burger et al. This Application is hereby incorporated by reference, is assigned to the same assignee as the present application, was filed on Oct. 12, 1998, and has been assigned U.S. Ser. No. 09/170,140.

The present invention supports an architecture that provides two page table formats. The first format supports a region-based linear page table, and will be referred to herein as a "short format" page table. A short format page table is provided for each virtual region, as shown in FIG. 5. The short format page table is linear, and has a linear entry for each translation in the region. Accordingly, the short format page table does not require chain segments, and the short format page table does not include hash tag entries.

The second format supports a single large page table for the entire computer system and will be referred to herein as a "long format" page table. The long format page table supports chain segments and long format page table entries include a hash tag field.

Figures 6, 7:
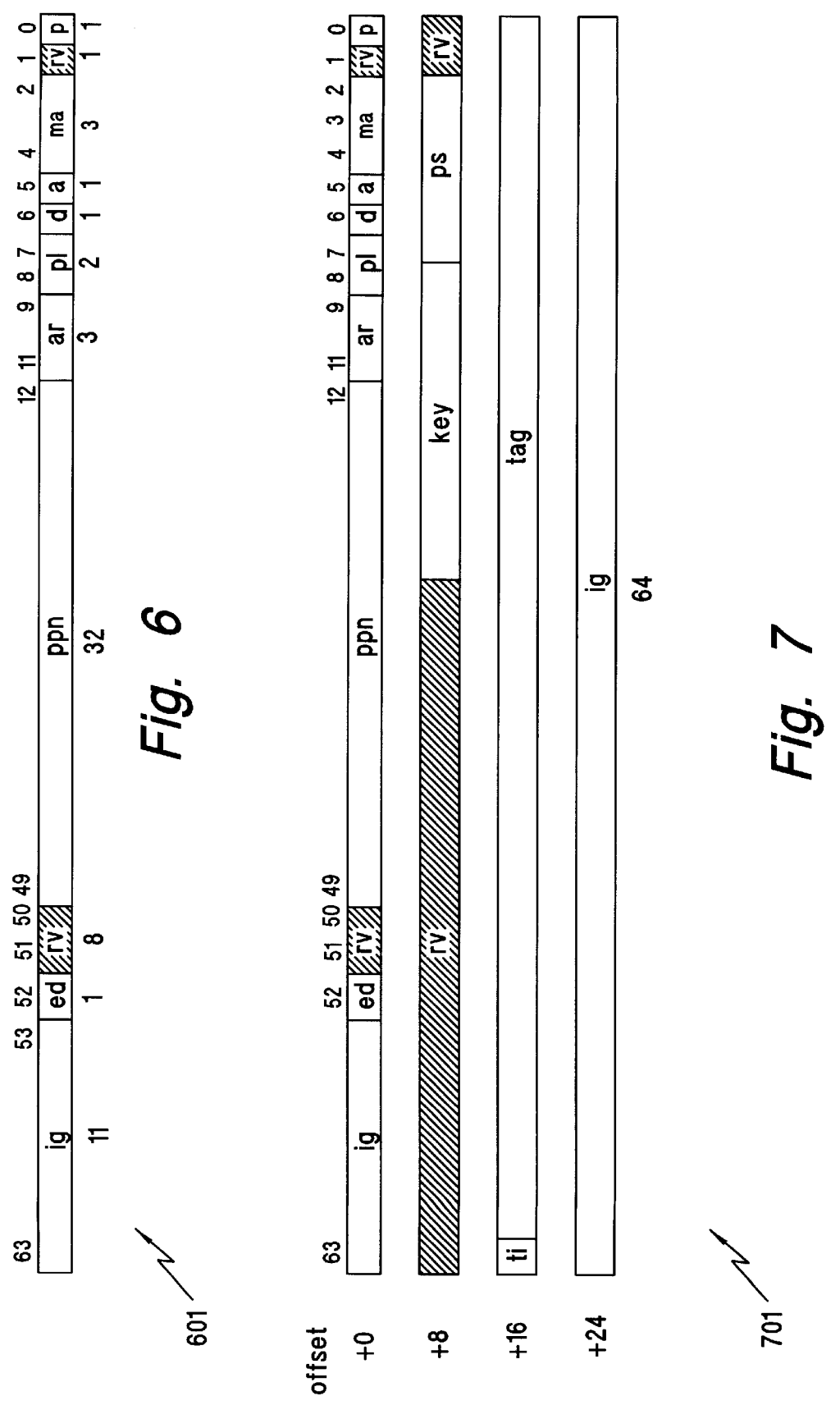

FIG. 6 shows a short format page table entry 601. Note that short format entry 601 comprise a single 64-bit word, and therefore has a total size of 8 bytes. The fields in short format entry 601 are described below in Table 1.

TABLE 1

| Entry Field | Description |
| --- | --- |
| p | Present bit. Indicates if the mapped physical page is actually in memory. |
| rv | Reserved. |
| ma | Memory Attribute - describes the cacheability, coherency, write-policy and speculative attributes of the mapped physical page. |
| a | Accessed Bit - Specifies how page faults are handled. |
| d | Dirty Bit - Specifies how faults caused by data writes to the page are handled. |

TABLE 1-continued

| Entry Field | Description |
| --- | --- |
| pl | Privilege Level - Specifies the privilege level of the page. |
| ar | Access Rights - Page level read, write and execute permissions and privilege controls. |
| ppn | Physical Page Number - Most significant bits of the mapped physical address. Depending on the page size used in the mapping, some of the least significant PPN bits are ignored. |
| ig | Software fields available to for operating system. Ignored by CPU. |
| ed | Exception Deferral - Indicates whether an exception or fault should be deferred. |

Note that a short format entry exists for each page in a region, and the virtual page number (vpn) of a translation is implied by the position of the short format entry in the virtual hash page table (VHPT). Also note that the page size is constant within a region. Therefore, the page size is available by accessing a preferred_page_size field of a configuration register associated with the region, as discussed below.

FIG. 7 shows a long format page table entry 701. Note that long format entry 701 comprise four 64-bit words, and therefore has a total size of 32 bytes. The first word of long format entry 701 is identical to short format entry 601, and therefore the fields in the first word are described above in Table 1. Table 2 below describes the remaining fields in long format entry 701.

TABLE 2

| Entry Field | Description |
| --- | --- |
| rv | Reserved. |
| ps | Page Size - Page size of the mapping. For page sizes larger than 4K bytes the low-order bits of the PPN and VPN are ignored. Page sizes are defined as $2^{ps}$ bytes. |
| key | Protection Key - Uniquely tags the translation to a protection domain. |
| tag | Translation tag. This tag, in conjunction with the long format hash index, is used to uniquely identify the translation. |
| ti | Tag invalid bit. Indicates that the tag is invalid. Software can use this bit to invalidate a long format entry. |
| ig | Software fields available to for operating system. Ignored by CPU. Note that the last 64 bits of the long format VHPT entry (starting at offset +24) will typically be used by the operating system to store a link to another long format VHPT entry if two or more virtual-to-physical translations hash to the same initial entry of the long format VHPT. |

Note that a single long format page table is used for all virtual addresses, entries may be chained together, and there is typically not an initial entry for every page. Therefore, the long format page table entry includes additional information, such as the page size (ps) and the tag. The VPN is uniquely represented by the hash index and the tag.

Finally, before discussing the algorithms of the present invention below, the following fields are available to the algorithms of the present invention. Note that some of these fields represent programmable variables that are stored in configuration registers, and therefore may be altered by software executing on a particular computer system. Other fields represent constants that will not vary within a particular implementation of a computer system, and therefore may be hard-coded into particular implementations of the algorithms of the present invention These fields are shown in Table 3 below.

TABLE 3

| Configuration Register Field Or Constant | Description |
|---|---|
| page_table_format | Indicates whether long format are short format page tables are being used. This programmable field is global and applies to all pages in memory. |
| preferred_page_size | Specifies the number of bytes in a page. Page sizes are encoded as N, wherein the page size is $2^N$ bytes. This programmable field can be specified for each region. Note that the preferred_page_size is copied into the (ps) field of each long format page table entry. |
| page_table_size | This programmable field indicates the number of bytes in the linear portion of the page table. In a short format page table, page_table_size is provided for each virtual region and also determines the size of the virtual region because a short format page table must have one entry for each page in the virtual region. Since a short table format is linear and cannot grow, page_table_size represents the exact size of a short format page table. In a long format page table, page_table_size indicates the length of the linear portion of the page table, and the page table can grow deeper as chain segments are added. Page table sizes are encoded as N, wherein the size of the page table is $2^N$ bytes. |
| page_table_base | This programmable field indicates the address of the first page table entry in memory. When short format page tables are used, each virtual region includes its own page table and the page_table_base is provided for each virtual region. When long format page tables are used, a single page table is provided and a single page table base indicates the address of the first long format page table entry. Note that only bits {63:min_pt_size} (see below) need to be stored. Also note that page_table_base must lie on a $2^{page\_table\_size}$ boundary. |
| impl_va_msb | This constant indicates the most significant bit of the virtual address supported by the particular computer system. |
| min_pt_size | This constant indicates the minimum size (in bytes) of both the long and short format page tables. The minimum page table size is represented as N, wherein the minimum number size of a page table is $2^N$ bytes. |

As mentioned above, in the region-based short format, the linear page table for each region resides in the referenced region itself. As a result, the short format VHPT consists of separate per-region page tables, which are anchored in each region by bits {60:min_pt_size} of page_table_base. For regions in which the VHPT is enabled, the operating system is required to maintain a per-region linear page table. As defined in the Short Format Algorithm below, the virtual address that is to be translated (VA), the region's preferred_page_size, the page_table_base, and the page_table_size are used to compute a linear index into the short format VHPT.

The size of the short format VHPT (page_table_size) defines the size of the mapped virtual address space. The maximum architectural table size in the short format is $2^{52}$ bytes per region. To map an entire region ($2^{61}$ bytes) using 4 kilobyte pages, $2^{(61-12)}$ (or alternatively, $2^{49}$) pages must be mappable. A short format VHPT entry is 8 bytes (or alternatively, $2^3$ bytes) large. As a result, the maximum table size is $2^{(61-12+3)}$ (or alternatively, $2^{52}$) bytes per region. If the short format is used to map an address space smaller than $2^{61}$, a smaller short format table (page_table_size<52) can be used. Mapping of an address space of $2^{N\ with}$ 4 kilobyte pages requires a minimum page_table_size of (N−9).

When using the short format VHPT, the THASH instruction (described above) returns a region-based short format index. The TTAG instruction, which is also described above, is not used with the short format. In the short format hashing algorithm below, the virtual address (VA) for which a VHPT entry address is desired is passed to the function tlb_vhpt_hash_short. The function returns the address (vhpt_addr) of the entry that corresponds to the virtual address.

Short Format Hashing Algorithm

1: tlb_vhpt_hash short (VA)
2: {
3:   hash_page_number=VA{impl_vamsb:0} u>>preferred_page_size;
4: hash_index=hash_page_number;
5: vhpt_offset=hash_index<<3;
6: vhpt_region=VA{63:61};
7: pmask=$2^{page\_table\_size}$−1;
8: vhpt_addr=(vhpt_region<<61)|
9:   (((page_table_base{60:min_pt_size} & ~pmask{60:min_pt_size})|
10:  (vhpt_offset{60:min_pt_size} & pmask{60:min_pt_size}))<<min_pt_size)|
11: vhpt_offset{min_pt_size−1:0};
12: return vhpt_addr;
13: }

At line 1 of the short format hashing algorithm, the function tlb_vhpt_hash_short is called, with the virtual address (VA) being passed to the function. At line 3, the hash_page number is calculated by dividing VA by the preferred_page_size. Note that only those bits of VA used by an implementation of a particular computer system (as defined by the constant impl_va_msb) are used. The division operation is accomplished by right-shifting VA by N bits, where the page size is $2^N$. The right-shift is unsigned. As discussed above, in one embodiment the page size may vary between 4 kilobytes and 256 megabytes, so VA will be shifted right by 12 to 28 bits.

At line 4, the hash_index is set to equal the hash_page_number. In the short format algorithm, this step is somewhat redundant, but is included to harmonize the short format and long format algorithms, as will be seen below. As discussed above, each entry in a short format VHPT is 8 bytes wide. Therefore, at line 5 an offset (vhpt_offset) into the page table is calculated by multiplying the hash_page_number by 8. This is performed by left-shifting the hash_index by three bit positions.

At line 6 the region (vhpt_region) of the VHPT is calculated. As discussed above, when using short format VHPTs, each region includes its own VHPT, so the region of the VHPT is the same as the region of the VA. Accordingly, the region of the VHPT is simply bits {63:61} of the VA.

At line 7 a mask (pmask) is formed by raising 2 by the number of bits corresponding to the page_table_size and subtracting 1. For example, to map an entire region ($2^{61}$ bytes) using the minimum 4 kilobyte preferred_page_size, $2^{(61-12)}$ (or alternatively, $2^{49}$) pages must be mappable. Since each short format VHPT entry is 8 (or alternatively, $2^3$) bytes, the minimum page_table_size is $2^{52}$. In this first example, the upper 12 bits of pmask will be "0" and the lower 52 bits will be "1". Likewise, to map an entire region ($2^{61}$ bytes) using the maximum 256 megabyte preferred_ page_size, $2^{(61-28)}$ (or alternatively, $2^{33}$) pages must be mappable. Since each short format VHPT entry is 8 (or alternatively, $2^3$) bytes, the minimum page_table_size (when mapping a complete region) is $2^{36}$. In this second example, the upper 28 bits of pmask will be "0" and the lower 36 bits will be "1". Of course, it is also possible to map less than the entire $2^{61}$ byte region, which may result in the page_table_size being less than $2^{36}$, depending on the preferred_page_size. The mask is used to select the components that form the resulting address of the VHPT entry corresponding to the VA, as described below.

At lines 8–11, the address of the entry of the VHPT corresponding to the VA (vhpt_addr) is calculated by ORing together a number of components. First, at line 8 the region component is calculated by left-shifting vhpt_region by 61 bits, thereby positioning the vhpt_region in the proper position of vhpt_addr.

Before discussing lines 9–11, consider that min_pt_size is a constant defined for each implementation of a computer system. The constant min_pt_size is represented as N, where the minimum size of the page table is $2^N$ bytes. Accordingly, it is always known that bits {min_pt_size-1:0} of vhpt_addr will be provided by the vhpt_offset. However, bits {60:min_pt_size} may be provided either by the page_table_base or the vhpt_offset, based on the page table_size. Accordingly, pmask, which was calculated at line 7, is used to select the proper bits of page_table_base and vhpt_offset based on the page_table_size.

Defining a minimum page table size does reduce (to some extent) the amount of logic required to implement a computer system in accordance with the present invention. For example, the register that holds each page_table_base only needs to store bits {63:min_pt_size}. Also, the width of the AND and OR operations discussed below with reference to lines 9 and 10 can be reduced by min_pt_size bits. In one embodiment, min_pt_size is 15, resulting in a minimum page table size of 32 kilobytes.

Accordingly, at line 9 bits {60:min_pt_size} of page_table_base are ANDed with the inverse of bits {60:min_pt_size} of pmask, and at line 10 bits {60:min_pt_size} of the vhpt_offset are ANDed with bits {60:min_pt_size} of pmask. The results of the two AND operations are ORed together, and the result is left-shifted by min_pt_size bit positions. Accordingly, lines 9 and 10 use pmask and min_pt_size to form that component of vhpt_addr that varies based on the size of the VHPT, and is known not to be exclusively provided by vhpt_offset based on min_pt_size. Note this component is ORed with the region component calculated at line 8.

Finally, at line 11 the component of vhpt addr that is based solely on vhpt_offset (bits {min_pt_size-1:0}) is ORed with the other two components calculated above to form the vhpt_addr. At line 12, the function tlb_vhpt_hash_short terminates and returns the vhpt_addr to the calling routine.

In the short format VHPT, each VHPT entry uniquely corresponds to a virtual address. However, in the long format VHPT, multiple virtual address may share an initial entry into the VHPT, with subsequent translations stored in VHPT entries that are chained to the initial entry by the operating system. After the initial entry is accessed, the proper virtual-to-physical translation is found by searching the initial and linked entries to find the tag (shown in FIG. 7) that corresponds to the virtual-to-physical translation. The long format algorithm is set forth below. Note that to avoid confusion, unique line numbers are used for all algorithms.

Long Format Hashing Algorithm

14: tlb_vhpt_hash_long (VA, region_id)
15: {
16: hash_page_number=VA{impla_msb:0} u>>preferred_page_size;
17: hash_index=((VA{63:61}<<52)|hash_page_number) ^ region_id;
18: vhpt_offset=hash_index<<5;
19: vhpt_region=page_table_base{63:61};
20: pmask=$2^{page\_table\_size}$-1;
21: vhpt_addr=(vhpt_region<<61)|
22: (((page_table_base{60:min_pt_size} & ~pmask{60:min_pt_size})|
23: (vhpt_offset{60:min_pt_size} & pmask{60:min_size}))<<min_pt_size)|
24: vhpt_offset{min_pt_size-1:0};
25: return vhpt_addr;
26: }

At line 14 of the long format hashing algorithm, the function tlb_vhpt_hash_long is called, with the virtual address (VA) and the 24-bit region_id being passed to the function. At line 16, the hash_page_number is calculated by dividing VA by the preferred_page_size. Note that only those bits of VA used by an implementation of a particular computer system (as defined by impla_va_msb) are used. The division operation is accomplished by right-shifting VA by N bits, where the page size is $2^N$. The right-shift is unsigned. As discussed above, in one embodiment the page size may vary between 4 kilobytes and 256 megabytes, so VA will be shifted right by 12 to 28 bits.

At line 17, the hash_index is formed. As discussed above, the hash_page_number is formed by shifting the VA right by at least 12 bits. Therefore, the maximum number of hash page numbers is $2^{52}$, and bits {64:52} of hash_page_number are "0". The first portion of line 17 shifts bits {63:61} of the VA (the region portion of the VA) left by 52 bits, and ORs the result with the hash_page_number. This increases the maximum potential size of the long format VHPT from $2^{52}$ entries (the maximum of hash page numbers) to $2^{55}$ entries. Finally, the result of the first portion of line 17 is XORed with the 24-bit region_id to form the hash_index.

As discussed above, a long format VHPT entry is 32 (or alternatively, $2^5$) bytes. Therefore, at line 18 the vhpt_offset is formed by shifting the hash_index to the left by 5 bit positions. At line 19, the vhpt_region is formed by retrieving bits {63:61} of the page_table_base. In contrast to the short format VHPTs, which exist in each region, only one long format VHPT is defined for the entire system.

Having calculated the hash_index, vhpt_offset, and vhpt_region at lines 17–19, pmask and vhpt_addr are calculated at lines 20–24. Note that lines 20–24 of the long format algorithm are identical to lines 7–11 of the short format algorithm. Accordingly, the vhpt_addr is formed in the same manner as described above with reference to the short format algorithm. Finally, at line 25, the function tlb_vhpt_hash_long terminates and returns the vhpt_addr to the calling routine.

Note that the vhpt_addr, in combination with the tag stored in a long format VHPT entry, uniquely identifies a virtual-to-physical translation when using the long format VHPT. A tag algorithm that ensures uniqueness with the long format hashing algorithm is set forth below.

Tag Algorithm

27: tag(VA, region_id)
28: {
29: pmask=$2^{page\_table\_size}$-1;
30: tpn=VA & ~pmask;
31: tag_for_entry=(region_id<<40)|(tpn>>12);

32: return tag_for_entry;
33: }

A computer system designed in accordance with the present invention supports both the long and short format VHPTs. As discussed above, the long and short format hashing algorithms are preferably implemented in hardware. As is known in the art, it is always desirable to minimize the number of transistors required to implement a particular function, while maximizing the execution speed of the function.

In examining the long and short format algorithms, one notices many similarities between the algorithms. In accordance with the present invention, a combined short and long format algorithm is provided below. By combining the short and long format algorithms, the number of transistors required to implement both algorithms is minimized without significantly affecting the execution speed of either algorithm. The combined hashing algorithm is set forth below:

Combined Hashing Algorithm

34: tlb_vhpt_hash_combined (VA, region_id)
35: {
36:  hash_page_number=VA {impl_va_msb:0} u>>preferred_page_size;
37: if (page_table_format==long){
38:  hash_index=((VA{63:61}<<52)|hash_page_number) ^region_id;
39: vhpt offset=hash_index <<5;
40: vhpt_region=page_table_base{63:61};
41: }
42: else {
43: hash_index=hash_page_number;
44: vhpt_offset=hash_index <<3;
45: vhp_region=VA{63:61};
46: }
47: pmask=2 $^{page}$-table-size-1;
48: vhpt_addr=(vhpt_region<<61)|
49:  (((page_table_base{60:min_pt_size} & ~pmask{60:min_pt_size})|
50: (vhpt_offset{60:min_pt_size} & pmask{60:min_pt_size})) <<min_pt_size)|
51: vhpt_offset{min_pt_size-1:0};
52: return vhpt_addr;
53: }

Basically, the combined hashing algorithm combines the common elements of the long and short format hashing algorithms, and the portions of the algorithms that are different are provided within an IF-THEN-ELSE block that test whether page_table_format is set to "long". Accordingly, at line 34 of the combined hashing algorithm, the function tlb_vhpt_hash combined is called, with the virtual address (VA) and the 24-bit region id being passed to the function. Note that the region_id will not be used if page_table_format is not set to "long". At line 36, the hash_page_number is calculated by dividing VA by the preferred_page_size, as it is at line 3 of the short format hashing algorithm and at line 16 of the long format hashing algorithm.

At line 37, page_table_format is tested to see if it is set to "long". If it is, hash_index, vhpt_offset, and vhpt_region are calculated at lines 38,39, and 40, respectively, as they are at lines 17, 18, and 19, respectively, of the long format hashing algorithm. If page_table_format is not set to "long", hash_index, vhpt_offset, and vhpt_region are calculated at lines 43, 44, and 45, respectively, as they are at lines 4, 5, and 6, respectively, of the short format hashing algorithm. Thereafter, pmask and vhpt_addr are calculated and the function terminates (returning vhptaddr to the calling routing) at lines 47–52. Note that lines 47–52 are identical to lines 7–12 of the short format hashing algorithm, and are identical to lines 20–25 of the long format hashing algorithm.

Accordingly, the present invention provides a combined hashing algorithm capable of generating an index into either a short format VHPT (were each VHPT entry uniquely identifies a virtual-to-physical translation) or a long format VHPT (were each initial VHPT entry in combination with a stored tag uniquely identifies a virtual-to-physical translation). Note that one implementing the combined algorithm of the present invention may also find additional commonalities in the portions of the combined hashing algorithm that are performed separately for the long and short formats. For example, the left shift performed at lines 39 and 44 could be implemented by a single shift circuit that shifts left two additional bit positions if the page_table_format is set to "long". Likewise, the calculation of the vhpt_region at lines 40 and 45 could use a multiplexor to select bits 63–61 from either the page_table_base or the VA based on the page_table_format. One designing a logic circuit to implement the combined hashing algorithm of the present invention may also recognize other ways of minimizing the logic required to implement the present invention.

Although the present invention has been described with reference to preferred embodiments, workers skilled in the art will recognize that changes may be made in form and detail without departing from the spirit and scope of the invention.

What is claimed is:

1. A method of forming an entry address that references an entry of a page table from a virtual address, wherein the virtual address includes a region portion that references an active region identifier that identifies a region, and the page table is capable of assuming a long format and a short format, the method comprising:

forming a hash page number from the virtual address by shifting the virtual address right by J bits, wherein a preferred page size of the region associated with the region portion of the virtual address is $2^J$ bytes;

forming a hash index by combining the hash page number and the region identifier referenced by the region portion of the virtual address if the format of the page table is set to long;

forming a table offset by shifting the hash index left by K bits, wherein each long format page table entry is $2^K$ bytes long, if the format of the page table is set to long;

forming a hash index by setting the hash index equal to the hash page number if the format of the page table is set to short;

forming a table offset by shifting the hash index left by L bits, wherein each short format page table entry is $2^L$ bytes long, if the format of the page table is set to short;

forming a mask based on a size of the page table;

forming a first address portion using a base address of the page table and the mask;

forming a second address portion using the table offset and the mask; and forming the entry address by combining the first and second address portions.

2. The method of claim 1 and further comprising:

forming a page table region by extracting the region portion from the base address of the page table if the format of the page table is set to long; and forming a page table region by extracting the region portion from the virtual address if the format of the page table is set to short;

and wherein forming the entry address comprises:
forming the entry address by combining the page table region and the first and second address portions, wherein the page table region is inserted into a region portion of the entry address.

3. The method of claim 1 wherein forming a hash page number from the virtual address comprises:
forming a hash page number from the virtual address by shifting only those portions of the virtual address that have been implemented right by J bits, wherein a preferred page size of the region associated with the region portion of the virtual address is $2^J$ bytes.

4. The method of claim 1 wherein forming a hash index by combining the hash page number and the region identifier referenced by the region portion of the virtual address if the format of the page table is set to long includes combining the region portion of the virtual address with the hash page number.

5. The method of claim 4 wherein combining the region portion of the virtual address with the hash page number comprises inserting bits of the region portion of the virtual address into the hash page number in bit positions of the hash page number known to be empty based on shifting the virtual address right by J bits.

6. The method of claim 1 wherein forming a mask based on the size of the page table comprises:
setting the mask equal to $2^M$ minus 1, wherein $2^M$ is the size of the page table.

7. The method of claim 6 wherein forming a first address portion using a base address of the page table and the mask comprises:
forming a first address portion by performing an AND operation upon the base address of the page table and an inverse of the mask; and
forming a second address portion using the table offset and the mask comprises:
forming a second address portion by performing an AND operation upon the table offset and the mask.

8. The method of claim 1 wherein forming the entry address by combining the first and second address portions comprises:
forming the entry address by performing an OR operation upon the first and second address portions.

9. The method of claim 1 wherein a minimum page table size of $2^N$ bytes has been defined, and forming a first address portion using a base address of the page table and the mask comprises:
forming a first address portion using the base address of the page table, not including the lower N bits of the base address of the page table, and the mask, not including the lower N bits of the mask;
forming a second address portion using the table offset and the mask comprises:
forming a second address portion using the table offset, not including the lower N bits of the table offset, and the mask, not including the lower N bits of the mask; and
forming the entry address by combining the first and second address portions comprises:
forming the entry address by combining the first and second address portions to form a result, shifting the result left by N bits, and combining the result with the lower N bits of the table offset.

10. A method of forming an entry address that references an entry of a page table from a virtual address, wherein the virtual address includes a region portion that references an active region identifier that identifies a region, a minimum size of the page table is $2^N$ bytes, and the page table is capable of assuming a long format and a short format, the method comprising:
forming a hash page number from the virtual address by shifting only those portions of the virtual address that have been implemented right by J bits, wherein a preferred page size of the region associated with the region portion of the virtual address is $2^J$ bytes;
forming a hash index by combining the hash page number, the region portion of the virtual address, and the region identifier referenced by the region portion of the virtual address, wherein the region portion of the virtual address is inserted combined into bit positions of the hash page number known to be empty based on shifting the virtual address right by J bits, if the format of the page table is set to long;
forming a table offset by shifting the hash index left by K bits, wherein each long format page table entry is $2^K$ bytes long, if the format of the page table is set to long;
forming a page table region by extracting the region portion from a base address of the page table if the format of the page table is set to long;
forming a hash index by setting the hash index equal to the hash page number if the format of the page table is set to short;
forming a table offset by shifting the hash index left by L bits, wherein each short format page table entry is $2^L$ bytes long, if the format of the page table is set to short;
forming a page table region by extracting the region portion from the virtual address if the format of the page table is set to short forming a mask raising 2 to the $M^{th}$ power and subtracting 1, wherein $2^M$ is the size of the table;
forming a first address portion by performing an AND operation upon the base address of the page table, not including the lower N bits of the base address of the page table, and an inverse of the mask, not including the lower N bits of the inverse of the mask;
forming a second address portion by performing an AND operation upon the table offset, not including the lower N bits of the table offset, and the mask, not including the lower N bits of the mask; and
forming the entry address by performing an AND operation upon the first and second address portions to form a first result, shifting the first result left by N bits to form a second result, and performing an OR operation on the page table region, the second result, and the lower N bits of the table offset, wherein the page table region is inserted into a region portion of the entry address.

11. A computer system having an architecture that defines a virtual address space addressed by virtual addresses that include a region portion that references an active region identifier that identifies a region, the computer system comprising:
a memory unit that includes a page table anchored by a page table base address, wherein the page table is capable of assuming a long format and a short format; and
a processor for executing instructions, wherein the processor includes a page table entry address generation unit capable of generating an entry address into the page table from a virtual address, the entry address generation unit comprising:
- a hash page number generation circuit that forms a hash page number from the virtual address by shifting the virtual address right by J bits, wherein a preferred page size of the region associated with the region portion of the virtual address is $2^J$ bytes;
- a hash index generation circuit that forms a hash index by combining the hash page number and the region identifier referenced by the region portion of the virtual address if the format of the page table is set to long, and forms the hash index by setting the hash index equal to the hash page number if the format of the page table is set to short;
- a table offset generation circuit that forms a table offset by shifting the hash index left by K bits, wherein each long format page table entry is $2^K$ bytes long, if the format of the page table is set to long, and forms the table offset by shifting the hash index left by L bits, wherein each short format page table entry is $2^L$ bytes long, if the format of the page table is set to short;
- a mask generation circuit that forms a mask based on a size of the page table;
- a first address portion generation circuit that forms a first address portion using the page table base address and the mask;
- a second address portion generation circuit that forms a second address portion using the table offset and the mask; and
- an entry address generation circuit that forms the entry address by combining the first and second address portions.

12. The computer system of claim 11 wherein the page table entry address generation unit of the processor and further comprises:
- a page table region generation circuit that forms a page table region by extracting the region portion from the page table base address if the format of the page table is set to long, and forms the page table region by extracting the region portion from the virtual address if the format of the page table is set to short; and
- the entry address generation circuit forms the entry address by combining the page table region and the first and second address portions, wherein the page table region is inserted into a region portion of the entry address.

13. The computer system of claim 11 wherein the hash page number generation circuit forms the hash page number from the virtual address by shifting only those portions of the virtual address that have been implemented right by J bits, wherein the preferred page size of the region associated with the region portion of the virtual address is $2^J$ bytes.

14. The computer system of claim 11 wherein the hash index generation unit forms the hash index by combining the hash page number, the region identifier referenced by the region portion of the virtual address, and the region portion of the virtual address if the format of the page table is set to long.

15. The computer system of claim 14 wherein the hash index generation unit also inserts bits of the region portion of the virtual address into the hash page number in bit positions of the hash page number known to be empty based on shifting the virtual address right by J bits.

16. The computer system of claim 15 wherein the mask generation unit forms the mask by setting the mask equal to $2^M$ minus 1, wherein $2^M$ is the size of the page table.

17. The computer system of claim 16 wherein the first address portion generation circuit forms the first address portion by performing an AND operation upon the page table base address and an inverse of the mask and the second address portion generation circuit forms the second address portion by performing an AND operation upon the table offset and the mask.

18. The computer system of claim 11 wherein the entry address generation circuit forms the entry address by performing an OR operation upon the first and second address portions.

19. The computer system of claim 11 wherein a minimum page table size of $2^N$ bytes has been defined, and the first address portion generation circuit forms the first address portion using the page table base address, not including the lower N bits of the page table base address, and the mask, not including the lower N bits of the mask, and the second address generation circuit forms the second address portion using the table offset, not including the lower N bits of the table offset, and the mask, not including the lower N bits of the mask, and the entry address generation circuit forms the entry address by combining the first and second address portions to form a result, shifting the result left by N bits, and combining the result with the lower N bits of the table offset.

20. A computer system having an architecture that defines a virtual address space addressed by virtual addresses that include a region portion that references an active region identifier that identifies a region, the computer system comprising:
- a memory unit that includes a page table anchored by a page table base address, wherein the page table is capable of assuming a long format and a short format and has a minimum size of $2^N$ bits; and
- a processor for executing instructions, wherein the processor includes a page table entry address generation unit capable of generating an entry address into the page table from a virtual address, the entry address generation unit comprising:
  - a hash page number generation circuit that form a hash page number from the virtual address by shifting only those portions of the virtual address that have been implemented right by J bits, wherein a preferred page size of the region associated with the region portion of the virtual address is $2^J$ bytes;
  - a hash index generation circuit that form a hash index by combining the hash page number, the region portion of the virtual address, and the region identifier referenced by the region portion of the virtual address, wherein the region portion of the virtual address is inserted combined into bit positions of the hash page number known to be empty based on shifting the virtual address right by J bits, if the format of the page table is set to long, and forms the hash index by setting the hash index equal to the hash page number if the format of the page table is set to short;
  - a page table offset generation circuit that forms a table offset by shifting the hash index left by K bits, wherein each long format page table entry is $2^K$ bytes long, if the format of the page table is set to long, and forms the table offset by shifting the hash index left by L bits, wherein each short format page table entry is $2^L$ bytes long, if the format of the page table is set to short;
  - a page table region generation circuit that forms a page table region by extracting the region portion from the page table base address if the format of the page table is set to long, and forms the page table region by extracting the region portion from the virtual address if the format of the page table is set to short;

a mask generation circuit that forms a mask by raising 2 to the $M^{th}$ power and subtracting 1, wherein $2^M$ is the size of the table;

a first address portion generation circuit that forms a first address portion by performing an AND operation upon the page table base address, not including the lower N bits of the page table base address, and an inverse of the mask, not including the lower N bits of the inverse of the mask;

a second address portion generation circuit that forms a second address portion by performing an AND operation upon the table offset, not including the lower N bits of the table offset, and the mask, not including the lower N bits of the mask; and and entry generation circuit that forms the entry address by performing an AND operation upon the first and second address portions to form a first result, shifting the first result left by N bits to form a second result, and performing an OR operation on the page table region, the second result, and the lower N bits of the table offset, wherein the page table region is inserted into a region portion of the entry address.

* * * * *